US012022163B2

(12) United States Patent
Yuan et al.

(10) Patent No.: US 12,022,163 B2
(45) Date of Patent: Jun. 25, 2024

(54) VIDEO PLAYING METHOD AND APPARATUS, ELECTRONIC DEVICE AND COMPUTER READABLE MEDIUM

(71) Applicant: Beijing Bytedance Network Technology Co., Ltd., Beijing (CN)

(72) Inventors: Fengbo Yuan, Beijing (CN); Shan Hua, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/818,932

(22) Filed: Aug. 10, 2022

(65) Prior Publication Data

US 2022/0385984 A1 Dec. 1, 2022

Related U.S. Application Data

(63) Continuation of application No. PCT/CN2021/076411, filed on Feb. 9, 2021.

(30) Foreign Application Priority Data

Feb. 11, 2020 (CN) .......................... 202010087507.0

(51) Int. Cl.
*H04N 21/485* (2011.01)
*H04N 21/431* (2011.01)
*H04N 21/472* (2011.01)

(52) U.S. Cl.
CPC ..... *H04N 21/4858* (2013.01); *H04N 21/4312* (2013.01); *H04N 21/47217* (2013.01)

(58) Field of Classification Search
CPC ........... H04N 21/4858; H04N 21/4312; H04N 21/47217
See application file for complete search history.

(56) References Cited

U.S. PATENT DOCUMENTS 6,069,606 A * 5/2000 Sciammarella .......... G09G 5/14
345/660
6,807,361 B1 * 10/2004 Girgensohn ........... G11B 27/34
386/282

(Continued)

FOREIGN PATENT DOCUMENTS

CN 102016779 A 4/2011
CN 104978118 A 10/2015

(Continued)

OTHER PUBLICATIONS

Decision on Rejection, dated Jun. 8, 2021, Chinese Patent Application No. 2020100875070, International Filing Date Feb. 11, 2020. 7 pages.

(Continued)

*Primary Examiner* — Nicholas Augustine
(74) *Attorney, Agent, or Firm* — Astute IP Law Group (57) ABSTRACT

Embodiments of the present disclosure disclose a video playing method and apparatus, an electronic device, and a computer readable medium. A specific implementation manner of the method includes: displaying a video playing page, where the video playing page includes video information and a user interaction control; in response to detecting a first user operation of a user on the video playing page, hiding the video information, adjusting opacity of the user interaction control from initial opacity to target opacity, and adjusting a display position of the user interaction control from an initial position to a target position, where obstructed area of a video displayed on the video playing page when the user interaction control is at the target position is smaller than obstructed area of the video displayed on the video playing page when the user interaction control is at the initial position.

20 Claims, 8 Drawing Sheets

(56) References Cited

U.S. PATENT DOCUMENTS

| | | | | |
|---|---|---|---|---|
| 7,194,527 | B2* | 3/2007 | Drucker | G06F 16/954 |
| | | | | 707/E17.009 |
| 7,246,322 | B2* | 7/2007 | Neely | G06F 16/78 |
| | | | | 715/747 |
| 7,437,005 | B2* | 10/2008 | Drucker | G06F 3/0485 |
| | | | | 707/E17.026 |
| 7,559,039 | B2* | 7/2009 | Ridgley | G06F 16/904 |
| | | | | 715/854 |
| 7,689,525 | B2* | 3/2010 | Drucker | G06F 16/48 |
| | | | | 715/764 |
| 7,769,832 | B2* | 8/2010 | Drucker | G06F 16/44 |
| | | | | 709/220 |
| 7,877,707 | B2* | 1/2011 | Westerman | G06F 3/04883 |
| | | | | 715/863 |
| 7,956,848 | B2* | 6/2011 | Chaudhri | G11B 27/105 |
| | | | | 345/173 |
| 2003/0030595 | A1* | 2/2003 | Radley-Smith | G06F 1/163 |
| | | | | 345/1.3 |
| 2004/0076444 | A1* | 4/2004 | Badovinac | G06F 1/1626 |
| | | | | 399/81 |
| 2005/0039140 | A1* | 2/2005 | Chen | G06F 3/0482 |
| | | | | 715/836 |
| 2005/0097135 | A1* | 5/2005 | Epperson | H04N 21/47217 |
| 2005/0120053 | A1* | 6/2005 | Watson | G06Q 30/06 |
| 2005/0138564 | A1* | 6/2005 | Fogg | G06F 16/9038 |
| | | | | 715/848 |
| 2005/0192924 | A1* | 9/2005 | Drucker | G06F 3/0483 |
| 2006/0212833 | A1* | 9/2006 | Gallagher | G06T 11/206 |
| | | | | 715/848 |
| 2007/0083818 | A1* | 4/2007 | Drucker | G06F 16/435 |
| | | | | 715/767 |
| 2007/0124677 | A1* | 5/2007 | de los Reyes | G06F 9/451 |
| | | | | 715/764 |
| 2008/0150890 | A1 | 6/2008 | Bell et al. | |
| 2008/0163379 | A1* | 7/2008 | Robinson | G06F 3/04815 |
| | | | | 715/738 |
| 2009/0058822 | A1* | 3/2009 | Chaudhri | G06F 3/14 |
| | | | | 345/173 |
| 2009/0300530 | A1* | 12/2009 | Falchuk | G11B 27/105 |
| | | | | 715/764 |
| 2011/0099316 | A1* | 4/2011 | Tseng | H04M 1/72454 |
| | | | | 710/304 |
| 2012/0170642 | A1* | 7/2012 | Braness | H04N 19/177 |
| | | | | 375/E7.026 |
| 2016/0239198 | A1* | 8/2016 | Shenkler | H04N 21/4316 |
| 2019/0297376 | A1 | 9/2019 | McCarty et al. | |
| 2020/0225737 | A1* | 7/2020 | Limor | G06T 15/60 |
| 2021/0195284 | A1* | 6/2021 | Song | H04N 21/4722 |
| 2022/0050582 | A1* | 2/2022 | Zhou | G06F 3/04817 |

FOREIGN PATENT DOCUMENTS

| | | |
|---|---|---|
| CN | 107193464 A | 9/2017 |
| CN | 108495165 A | 9/2018 |
| CN | 109529319 A | 3/2019 |
| CN | 110647286 A | 1/2020 |
| CN | 111294637 A | 6/2020 |
| JP | 2009284468 A | 12/2009 |
| JP | 2018026799 A | 2/2018 |
| KR | 1020110117490 A | 10/2011 |

OTHER PUBLICATIONS

First Office Action, dated Sep. 11, 2020, Chinese Patent Application No. 202010087507.0, International Filing Date Feb. 11, 2020. 15 pages.

Second Office Action, dated Dec. 11, 2020, Chinese Patent Application No. 202010087507.0, International Filing Date Feb. 11, 2020. 10 pages.

Third Office Action, dated Mar. 11, 2021, Chinese Patent Application No. 202010087507.0, International Filing Date Feb. 11, 2020. 17 pages.

Fourth Office Action, dated May 31, 2022, Chinese Patent Application No. 202010087507.0, International Filing Date Feb. 11, 2020. 18 pages.

Steve Heffernan, Hiding and Showing Video Player Controls, Video.js Blog, Aug. 9, 2013, Website.

International Search Report for PCT/CN2021/076411, dated Apr. 26, 2021, International Filing Date Feb. 9, 2021. 11 pages.

Extended European Search Report in EP21754419.6, dated May 31, 2023, 218 pages.

Notice of Allowance in JP2022-548724, mailed Dec. 5, 2023, 6 pages.

Office Action in KR10-2022-7027786, mailed Dec. 5, 2023, 13 pages.

* cited by examiner

VIDEO PLAYING METHOD AND APPARATUS, ELECTRONIC DEVICE AND COMPUTER READABLE MEDIUM

CROSS-REFERENCE TO RELATED APPLICATIONS

This application is a continuation of International Application No. PCT/CN2021/076411, filed on Feb. 9, 2021, which claims priority to Chinese Patent Application No. 202010087507.0, filed on Feb. 11, 2020, both of which are hereby incorporated by reference in their entireties.

TECHNICAL FIELD

Embodiments of the present disclosure relates to the field of computer technologies, and in particular, to a video playing method and apparatus, an electronic device and a computer readable medium.

BACKGROUND

When a video is played on various video playing applications, a video playing interface includes various kinds of information related to the video being played currently, such as a title of the video, a background music, user interaction data, etc. This information may cause some degree of obstruction and interference to the video, hindering a user from watching the video. In addition, during a process of video playing, the user may pause the video by clicking or other gestures. However, due to existence of a large-area pause hotspot in the video playing interface, an accidental operation is prone to occur, which further interfere with the video playing.

SUMMARY

The summary of the present disclosure is used to introduce conceptions in a concise form, and the conceptions will be described in detail in the following description of embodiments. The summary of the present disclosure is not intended to identify key features or essential features of technical solutions for which protection is sought, nor is it intended to limit the scope of the technical solutions for which protection is sought.

Some embodiments of the present disclosure propose a video playing method and apparatus, an electronic device and a computer readable medium to solve the technical problem mentioned in the background section above.

In a first aspect, some embodiments of the present disclosure provide a video playing method, including: displaying a video playing page, where the video playing page includes video information and a user interaction control; in response to detecting a first user operation of a user on the video playing page, hiding the video information, adjusting opacity of the user interaction control from initial opacity to target opacity, and adjusting a display position of the user interaction control from an initial position to a target position, where obstructed area of a video displayed on the video playing page when the user interaction control is at the target position is smaller than obstructed area of the video displayed on the video playing page when the user interaction control is at the initial position.

In a second aspect, some embodiments of the present disclosure provide a video playing apparatus, including: a displaying unit, configured to display a video playing page, where the video playing page includes video information and a user interaction control; an adjusting unit, configured to, in response to detecting a first user operation of a user on the video playing page, hide the video information, adjust opacity of the user interaction control from initial opacity to target opacity, and adjust a display position of the user interaction control from an initial position to a target position, where obstructed area of a video displayed on the video playing page when the user interaction control is at the target position is smaller than obstructed area of the video displayed on the video playing page when the user interaction control is at the initial position.

In a third aspect, some embodiments of the present disclosure provide an electronic device, including: one or more processors; a storage apparatus on which one or more programs are stored, where when the one or more programs are executed by the one or more processors, the one or more processors are caused to implement any one of the aforementioned methods.

In a fourth aspect, some embodiments of the present disclosure provide a computer readable medium on which a computer program is stored, where any one of the aforementioned methods is implemented when the computer program is executed by a processor.

In a fifth aspect, some embodiments of the present disclosure provide a computer program product including a computer program carried on a computer readable medium, where when the computer program is executed by a processor, the processor is caused to implement any one of the aforementioned methods.

In a sixth aspect, some embodiments of the present disclosure provide a computer program that, when running on an electronic device, causes the electronic device to implement any one of the aforementioned methods.

An embodiment of the above various embodiments of the present disclosure has following beneficial effects: a user can enter a pure mode by performing a certain operation (for example, a click). In the pure mode, video information can be hidden to reduce obstruction and interference to a played video. In addition, by changing a display position and opacity of a user interaction control on a video playing page, the obstruction and interference to the played video can be further reduced. In addition, since pausing a video through clicking or other gestures is canceled, interference caused by an accidental operation to video playing is avoided.

BRIEF DESCRIPTION OF DRAWINGS

Combined with drawings and with reference to following detailed implementations, the above and other features, advantages and aspects of various embodiments in the present disclosure will become more apparent. Throughout the drawings, same or similar reference numbers refer to same or similar elements. It should be understood that the drawings are schematic, and components and elements are not necessarily drawn to scale.

DESCRIPTION OF EMBODIMENTS

The embodiments of the present disclosure will be described in more detail below with reference to the drawings. Although some embodiments of the present disclosure are shown in the drawings, it should be understood that the present disclosure may be realized in various forms and should not be construed as being limited to the embodiments set forth herein. On the contrary, these embodiments are provided for a more thorough and complete understanding of the present disclosure. It should be understood that the drawings and the embodiments of the present disclosure are for illustrative purposes only, and are not intended to limit scope of protection of the present disclosure.

In addition, it should be noted that for the convenience of description, only parts related to a relevant disclosure are shown in the drawings. The embodiments in the present disclosure and features in the embodiments may be combined with each other when there is no conflict.

It should be noted that concepts of "first" and "second" mentioned in the present disclosure are only used to distinguish different apparatuses, modules or units, and are not used to limit order or interdependence of functions performed by these apparatuses, modules or units.

It should be noted that modifications of "one" and "more" mentioned in the present disclosure are illustrative rather than restrictive, and persons skilled in the art should understand that unless being clearly indicated in the context, otherwise, it should be understood as "one or more".

Names of messages or information exchanged between a plurality of apparatuses in the embodiments of the present disclosure are for illustrative purposes only, and are not used to limit scope of these messages or information.

The present disclosure will be described in detail below with reference to the drawings and combined with embodiments.

Figure 1:
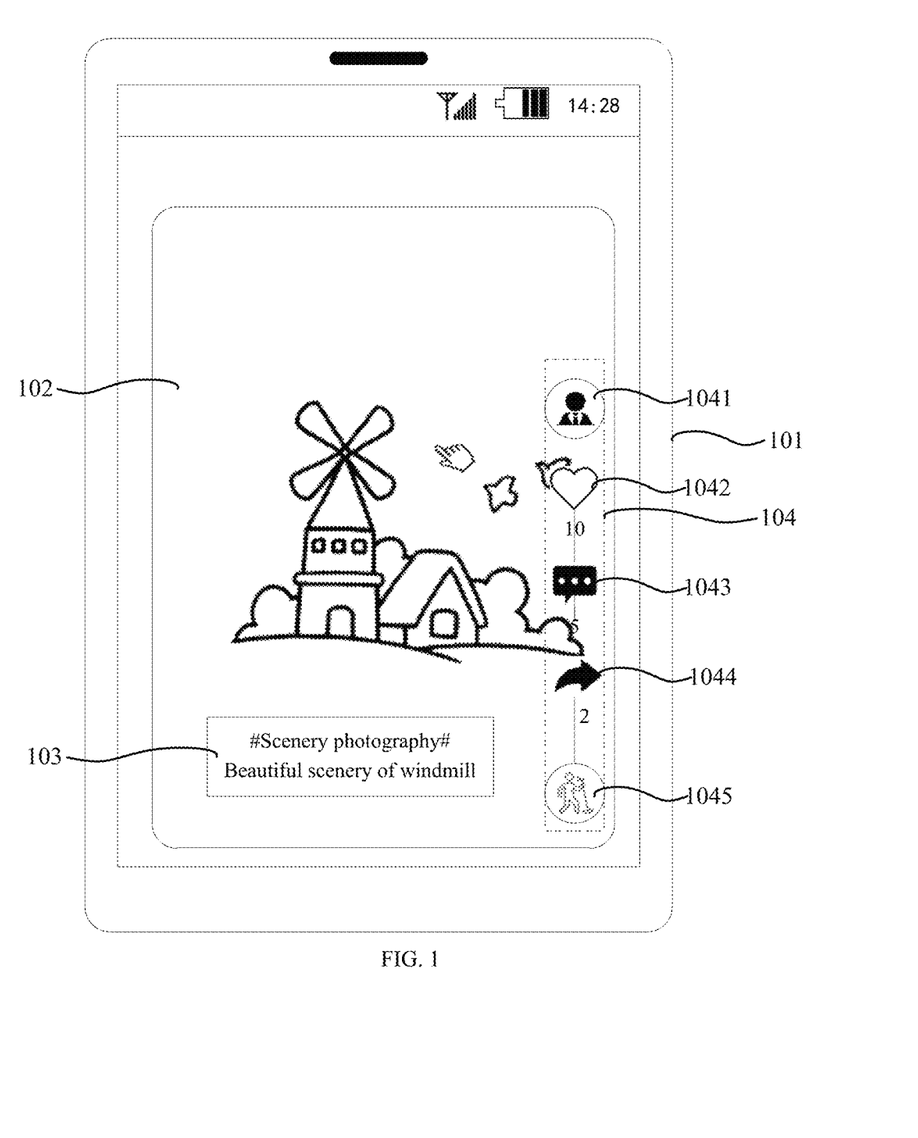
FIG. 1 and FIG. 2 are schematic diagrams of an application scenario of a video playing method according to some embodiments of the present disclosure.
Figure 2:
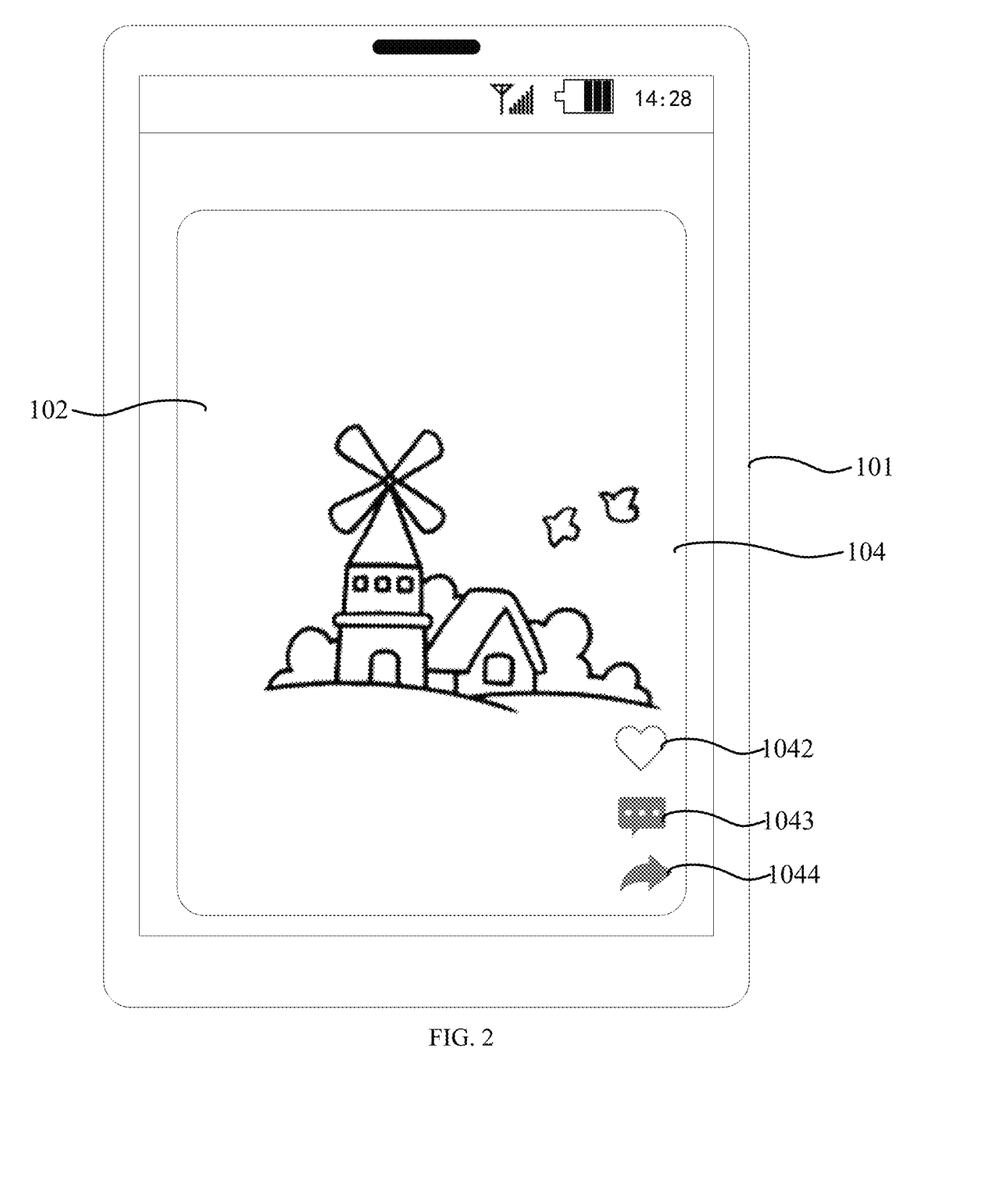

FIG. 1 and FIG. 2 are schematic diagrams of an application scenario of a video playing method according to some embodiments of the present disclosure.

The video playing method provided by some embodiments of the present disclosure is generally performed by a terminal device. It should be noted that the terminal device may be hardware or software. When being hardware, the terminal device may be various electronic devices supporting video processing, including but not limited to a smart phone, a tablet computer, an e-book reader, an on-board terminal, etc. When being software, the terminal device may be installed in the electronic devices listed above. The terminal device may be implemented, for example, as a plurality of pieces of software or software modules configured to provide a distributed service, or as a single piece of software or software module. No specific limitation is made herein.

As shown in FIG. 1, an executing subject of the video playing method may be a video playing application installed on a smart phone 101. Thus, the video playing application may first display a video playing page 102, where the video playing page 102 includes video information 103 and a user interaction control 104. In the present application scenario, as an example, the video information 103 includes a title of a video, video content information, user interaction data (for example, 10 likes, 5 comments, 2 forwards), etc. As an example, the user interaction control 104 may include controls 1041, 1042, 1043, 1044 and 1045, which respectively support a user to comment, like, share, enter a personal page, view background music, etc. As shown in the figure, the video information 103 and the user interaction control 104 cause some degree of obstruction to the played video.

Based on this, in response to detecting a first user operation (for example, a click operation) of the user on the video playing page 102, the video information 103 is hidden, opacity of the user interaction control is adjusted from initial opacity to target opacity, and a display position of the user interaction control is adjusted from an initial position to a target position, where obstructed area of the video displayed on the video playing page when the user interaction control is at the target position is smaller than obstructed area of the video displayed on the video playing page when the user interaction control is at the initial position. As an example, opacity of controls 1041 and 1045 may be adjusted to 0, opacity of controls 1042, 1043, 1044 may be adjusted to 50%, and display position of controls 1042, 1043, 1044 may be moved downward. An adjusted page is shown in FIG. 2, and thus the problem that the video is obstructed can be solved.

Figure 3:
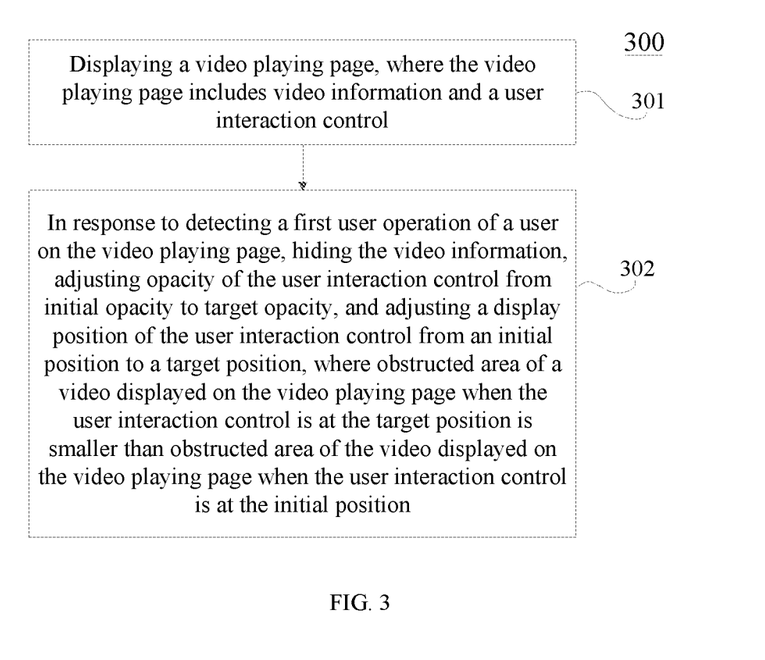
FIG. 3 is a flowchart according to some embodiments of a video playing method in the present disclosure.

With continued reference to FIG. 3, a flowchart 300 according to some embodiments of a video playing method in the present disclosure is shown. The video playing method includes following steps:

Step 301, displaying a video playing page, where the video playing page includes video information and a user interaction control.

In some embodiments, the executing subject of the video playing method may display the video playing page. The video playing page may be a page that supports video playing. The video playing page may include the video information and the user interaction control, where the video information may be various kinds of information of a video, including but not limited to: a title of the video, content information, background music information, user interaction data (for example, likes, comments, and forwards), etc. The user interaction control may be a control that supports user interaction. The user interaction includes but is not limited to: giving a like, making a comment, sharing, entering a personal page, viewing background music, etc.

Step 302, in response to detecting a first user operation of a user on the video playing page, hiding the video information, adjusting opacity of the user interaction control from initial opacity to target opacity, and adjusting a display position of the user interaction control from an initial position to a target position, where obstructed area of a video displayed on the video playing page when the user interaction control is at the target position is smaller than obstructed area of the video displayed on the video playing page when the user interaction control is at the initial position.

In some embodiments, in response to detecting the first user operation of the user on the video playing page, the video information may be hidden. According to actual needs, the first user operation may be various gestures (for example, a click, a double click, a slide, etc.), or may be operations such as voice input, image input. In addition, the opacity of the user interaction control may also be adjusted from the initial opacity to the target opacity. And the display position of the user interaction control is adjusted from the initial position to the target position. The obstructed area of the video displayed on the video playing page when the user interaction control is at the target position is smaller than the obstructed area of the video displayed on the video playing page when the user interaction control is at the initial position. In practice, according to actual needs, in a condition that there is a plurality of user interaction controls, target position and target opacity of each of the user interaction controls may be changed respectively, where the target position and the target opacity of each of the user interaction controls may be determined in advance or according to actual needs.

In some implementation manners of some embodiments, the video playing page further includes pushed information related to the video being played currently; and the method further includes: in response to detecting the first user operation of the user on the video playing page, hiding relevant pushed information. Thus, the problem that the video is obstructed can be further solved in a condition that the pushed information related to the video being played currently is included.

In these implementation manners, the pushed information related to the video being played currently may be various kinds of information, which, for example, may be an introduction of an item displayed in the video, a purchase link of the item, etc.

In some implementation manners of some embodiments, in response to the video displayed on the video playing page being a landscape video, a landscape entry control is displayed on the video playing page, where the landscape entry control is used to trigger entry into a landscape page; and in response to detecting a third user operation on the landscape entry control, the video displayed on the video playing page is displayed in a landscape mode. In these implementation manners, displaying the video in a landscape mode is realized by displaying the landscape entry control.

Figure 4:
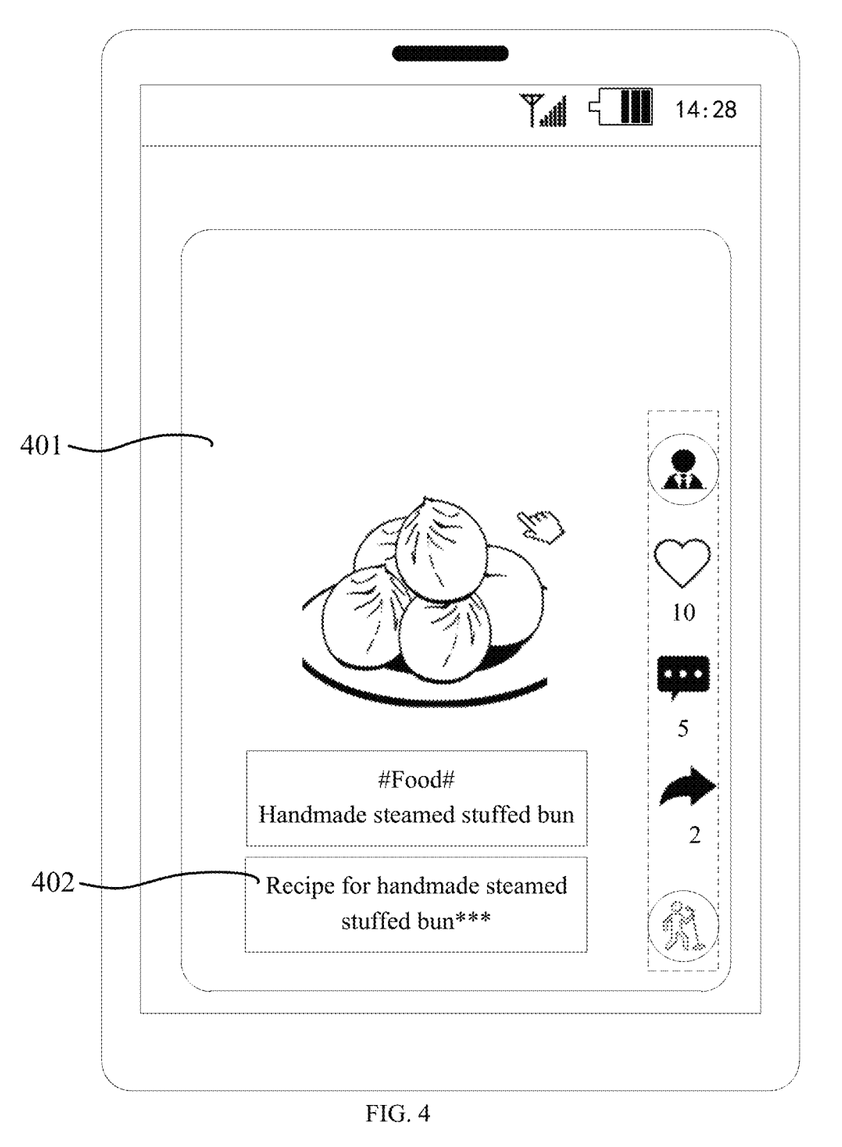
FIG. 4 and FIG. 5 are illustrative application scenario diagrams of a video playing method according to some embodiments of the present disclosure when pushed information related to a video being played currently is included on a video playing page.
Figure 5:
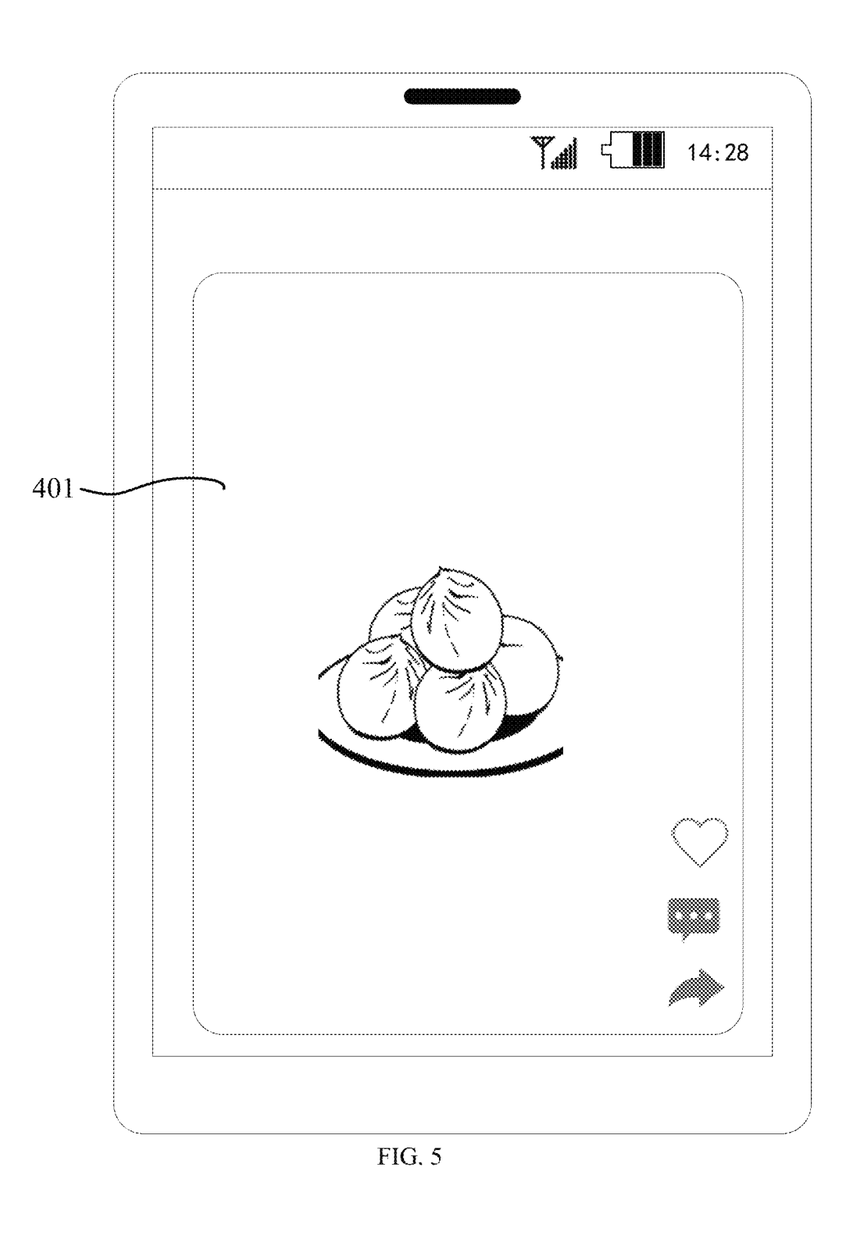

Reference is made to FIG. 4 and FIG. 5, which show illustrative application scenario diagrams of a video playing method according to the present disclosure when relevant information of a video being played currently is included on a video playing page. As shown in FIG. 4, a video playing page 401 includes pushed information related to a video being played currently, that is, an introduction of an item displayed in the video "Recipe for handmade steamed stuffed bun*" 402. In response to detecting a first user operation (for example, a click) of a user on the video playing page 401, the introduction "Recipe for handmade steamed stuffed bun*" 402 may be hidden. With continued reference to FIG. 5, an illustrative effect diagram after hiding the relevant pushed information is shown.

In some implementation manners of some embodiments, the video playing page further includes a first control, and the first control is used to trigger a page jump; and the method further includes: in response to detecting a second user operation of the user on the first control, displaying a jump page corresponding to the video being played currently.

In the method provided by some embodiments of the present disclosure, a user may enter a pure mode by performing a certain operation (for example, a click). In the pure mode, video information may be hidden to reduce obstruction and interference to a played video. In addition, by changing the display position and opacity of a user interaction control in a video playing page, the obstruction and the interference to the played video can be further reduced. In addition, since pausing a video through clicking or other gestures is canceled, interference caused by an accidental operation to video playing is avoided.

Figure 6:
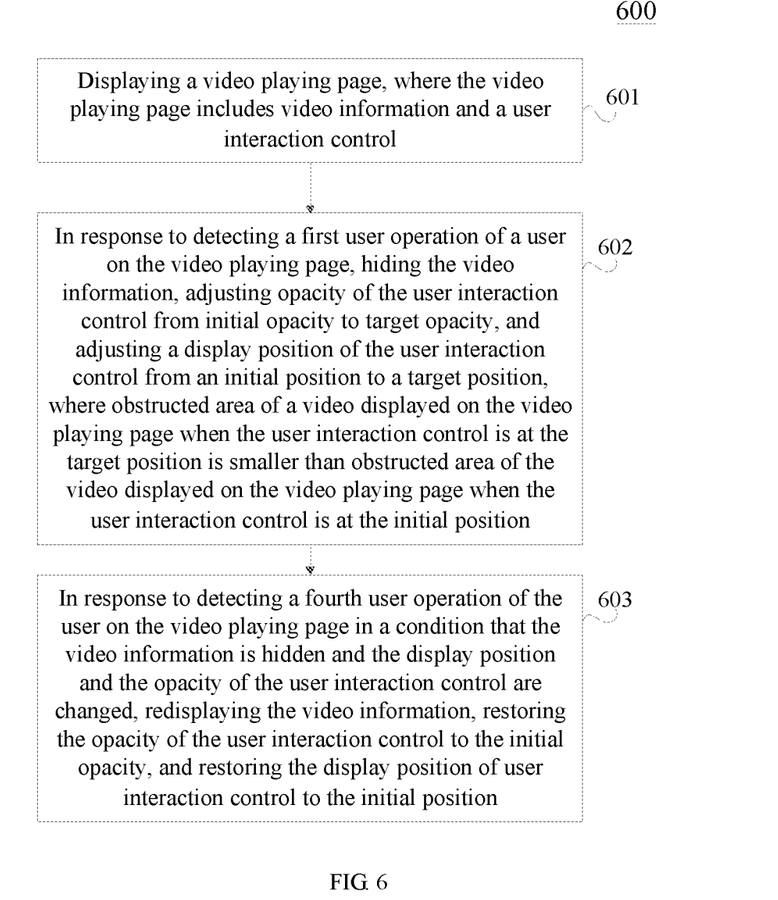
FIG. 6 is a flowchart according to some other embodiments of a video playing method in the present disclosure.

Referring further to FIG. 6, a flow 600 of some other embodiments of a video playing method is shown. The flow 600 of the video playing method includes following steps:

Step 601, displaying a video playing page, where the video playing page includes video information and a user interaction control.

Step 602, in response to detecting a first user operation of a user on the video playing page, hiding the video information, adjusting opacity of the user interaction control from initial opacity to target opacity, and adjusting a display position of the user interaction control from an initial position to a target position, where obstructed area of a video displayed on the video playing page when the user interaction control is at the target position is smaller than obstructed area of the video displayed on the video playing page when the user interaction control is at the initial position.

In some embodiments, reference may be made to steps 301-302 in the embodiments corresponding to FIG. 3 for specific implementations of steps 601-602 and technical effects thereof, which will not be repeated herein.

In some implementation manners of some embodiments, in response to detecting a first user operation of a user on the video playing page, at least one of the following is displayed: a video progress adjustment control, a video playing control, or a video rotation control.

Figure 7:
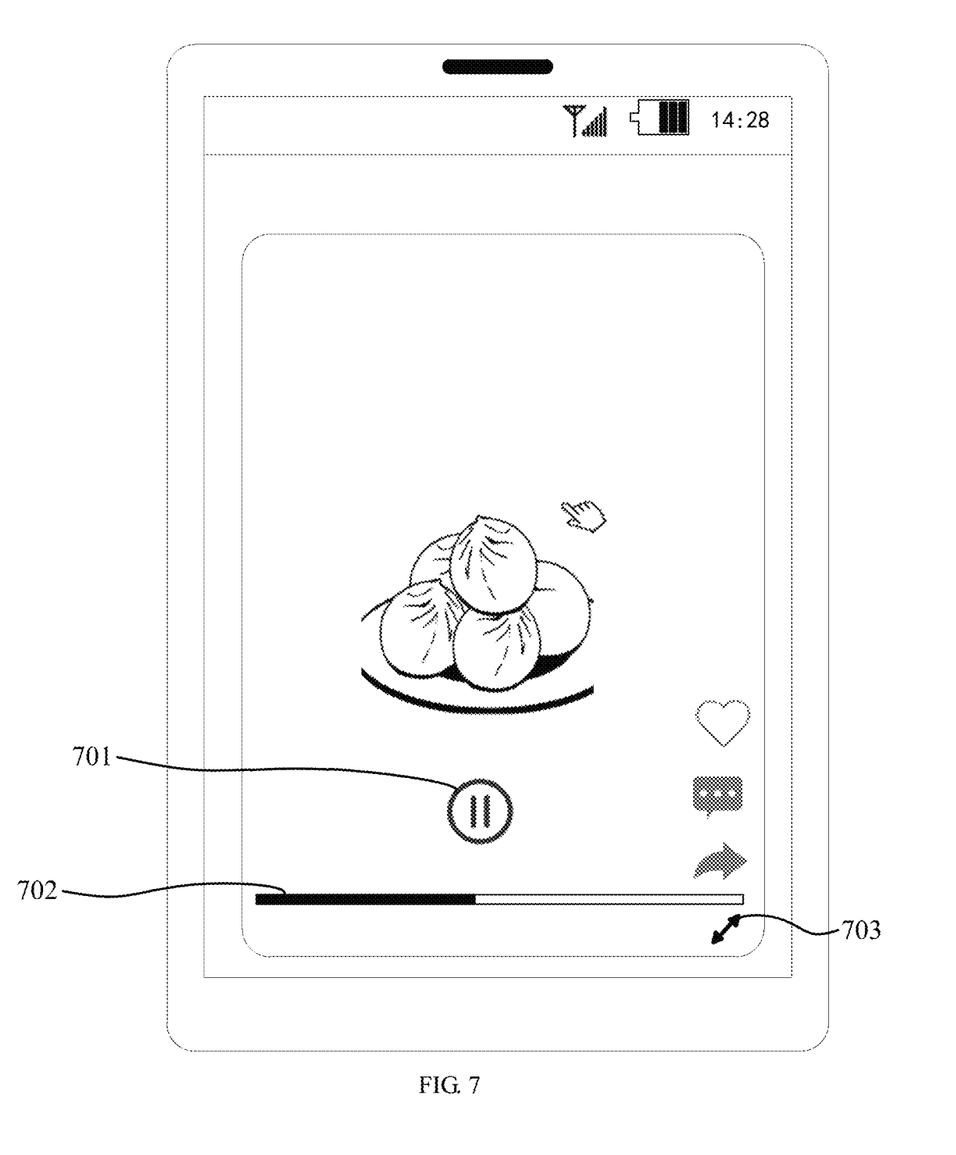
FIG. 7 is an illustrative application scenario diagram of detecting a first user operation of a user on a video playing page and displaying a video progress adjustment control, a video playing control and a video rotation control according to some embodiments of a video playing method in the present disclosure.

In these implementation manners, by displaying the video playing control, the user can be supported to control pause or play to make up for defect caused by canceling the gesture pause. In addition, the video progress adjustment control supports the user to adjust progress, and the video rotation control supports the user to rotate the video, so as to enhance operability in the pure mode. As an example, referring to FIG. 7, a video playing control 701, a video progress adjustment control 702, and a video rotation control 703 are shown as examples.

Step 603, in response to detecting a fourth user operation of the user on the video playing page in a condition that the video information is hidden and the display position and the opacity of the user interaction control are changed, redisplaying the video information, restoring the opacity of the user interaction control to the initial opacity, and restoring the display position of the user interaction control to the initial position.

In some embodiments, in response to detecting the fourth user operation of the user on the video playback page in the condition that the video information is hidden and the display position and the opacity of the user interaction control are changed, that is, in the pure mode, the video information is redisplayed, the opacity of the user interaction control is restored to the initial opacity, and the display position of the user interaction control is restored to the initial position.

In some implementation manners of some embodiments, in response to detecting a video switching operation of the user on the video playing page in the condition that the video information is hidden and the display position and the opacity of the user interaction control are changed, a video after switching and video information of the video after switching are displayed, and the user interaction control is displayed at the initial position with the initial opacity. In these implementation manners, after the user performs video switching through a video switching operation such as a downward slide, the video after switching and the video information of the video after switching may be displayed, and the user interaction control is displayed at the initial position with the initial opacity. In other words, in these implementation manners, changes of the display position and opacity of the user interaction control do not affect a display mode of the video after switching.

In some embodiments, compared with the embodiment corresponding to FIG. 3, steps of operations in the pure mode are added, and according to actual needs, a previous mode may be returned to to achieve further mode switching.

Figure 8:
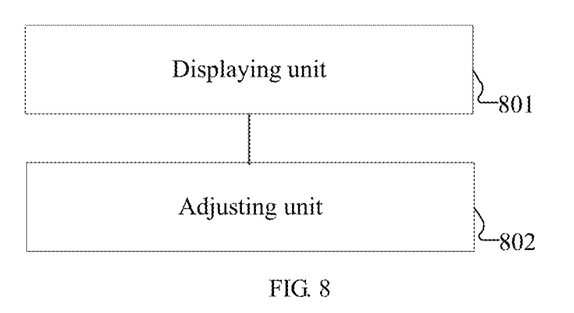
FIG. 8 is a schematic structural diagram according to some embodiments of a video playing apparatus in the present disclosure.

Referring further to FIG. 8, as an implementation of the methods shown in the aforementioned figures, the present disclosure provides some embodiments of a video playing apparatus, where the video playing apparatus corresponds to those method embodiments shown in FIG. 3, and the apparatus may be specifically applied to various electronic devices.

As shown in FIG. 8, the video playing apparatus 800 of some embodiments includes: a displaying unit 801 and an adjusting unit 802. The displaying unit 801 is configured to display a video playing page, where the video playing page includes video information and a user interaction control; and the adjusting unit 802 is configured to, in response to detecting a first user operation of a user on the video playing page, hide the video information, adjust opacity of the user interaction control from initial opacity to target opacity, and adjust a display position of the user interaction control from an initial position to a target position, where obstructed area of a video displayed on the video playing page when the user interaction control is at the target position is smaller than obstructed area of the video displayed on the video playing page when the user interaction control is at the initial position.

In some embodiments, specific implementations of the displaying unit 801 and the adjusting unit 802 in the video playing apparatus 800 and technical effects thereof may refer to the embodiment corresponding to FIG. 3, which will not be repeated herein.

In an implementation manner of some embodiments, the adjusting unit 802 may further be configured to, in response to detecting a first user operation of a user on the video playing page, display at least one of the following: a video progress adjustment control, a video playing control, or a video rotation control.

In an implementation manner of some embodiments, the video playing page further includes pushed information related to the video being played currently; and the apparatus 800 may further include a hiding unit (not shown in the figure), where the hiding unit is configured to, in response to detecting the first user operation of the user on the video playing page, hide the pushed information.

In an implementation manner of some embodiments, the video playing page further includes a first control, where the first control is used to trigger a page jump; and the apparatus 800 may further include a displaying unit (not shown in the figure), where the displaying unit is configured to, in response to detecting a second user operation of the user on the first control, display a jump page corresponding to the video being played currently.

In an implementation manner of some embodiments, the displaying unit 801 is further configured to: in response to the video displayed on the video playing page being a landscape video, display a landscape entry control on the video playing page, where the landscape entry control is used to trigger entry into a landscape page; and in response to detecting a third user operation on the landscape entry control, display the video displayed on the video playing page in a landscape mode.

In an implementation manner of some embodiments, the adjusting unit 802 may also be further configured to: in response to detecting a fourth user operation of the user on the video playing page in a condition that the video information is hidden and the display position and the opacity of the user interaction control are changed, redisplay the video information, restore the opacity of the user interaction control to the initial opacity, and restore the display position of user interaction control to the initial position.

In an implementation manner of some embodiments, the displaying unit 801 is further configured to: in response to detecting a video switching operation of the user on the video playing page in the condition that the video information is hidden and the display position and the opacity of the user interaction control are changed, display a video after switching and video information of the video after switching, and display the user interaction control at the initial position with the initial opacity.

In some embodiments, the user may enter a pure mode by performing a certain operation (for example, a click). In the pure mode, video information may be hidden to reduce obstruction and interference to a played video. In addition, by changing a display position and opacity of a user interaction control in a video playing page, the obstruction and the interference to the played video can be further reduced. In addition, since pausing a video through clicking or other gestures is canceled, interference caused by an accidental operation to video playing is avoided.

In the following, please refer to FIG. 9, which shows a schematic structural diagram of an electronic device (such as the smart phone in FIG. 1) 900 suitable for implementing the embodiments of the present disclosure. The electronic device in the embodiments of the present disclosure may include, but is not limited to, a mobile terminal such as a mobile phone, a laptop, a digital broadcast receiver, a PDA (personal digital assistant), a PAD (a tablet computer), a PMP (portable multimedia player), and an on-board terminal (for example, an on-board navigation terminal), and a fixed terminal such as a digital TV and a desktop computer, etc. The electronic device shown in FIG. 9 is only an example, and should not cause any restriction on functions and application scope of the embodiments of the present disclosure.

Figure 9:
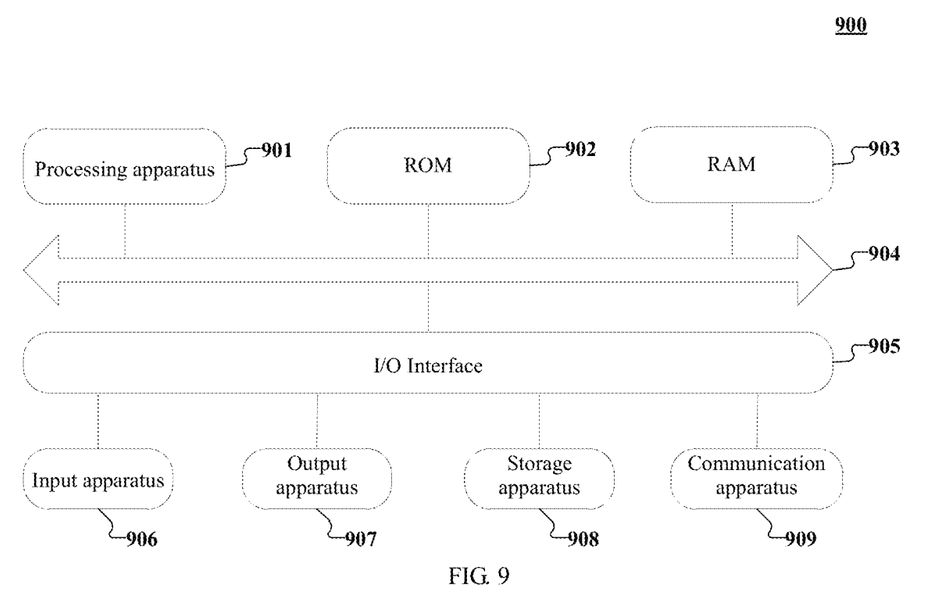
FIG. 9 is a schematic structural diagram of an electronic device suitable for implementing some embodiments of the present disclosure.

As shown in FIG. 9, the electronic device 900 may include a processing apparatus (for example, a central processing unit, a graphics processor, etc.) 901, which may perform various appropriate actions and processing according to a program stored in a read-only memory (ROM) 902 or a program loaded into a random-access memory (RAM) 903 from a storage apparatus 908. In the RAM 903, various programs and data required for operations of the electronic device 900 are also stored. The processing apparatus 901, the ROM 902 and the RAM 903 are connected to each other through a bus 904. An input/output (I/O) interface 905 is also connected to the bus 904.

Generally, following apparatuses may be connected to the I/O interface 905: an input apparatus 906 including, for example, a touch screen, a touch pad, a keyboard, a mouse, a camera, a microphone, an accelerometer, a gyroscope, etc.; an output apparatus 907, including, for example, a liquid crystal display (LCD), a speaker, a vibrator, etc.; a storage apparatus 908 including, for example, a storage card, etc.; and a communication apparatus 909. The communication apparatus 909 may allow the electronic device 900 to perform a wireless or wired communication with other devices to exchange data. Although FIG. 9 shows an electronic device 700 with various apparatuses, it should be understood that it is not required to implement or provide all the apparatuses shown. More or fewer apparatuses may alternatively be implemented or provided. Each block shown in FIG. 9 may represent one apparatus or a plurality of apparatuses as needed.

Particularly, according to some embodiments of the present disclosure, a process described above with reference to a flowchart may be implemented as a computer software program. For example, some embodiments of the present disclosure include a computer program product, which includes a computer program carried on a computer readable medium, and the computer program containing program code for performing a method shown in the flowchart. In such embodiments, the computer program may be downloaded and installed from a network through the communication apparatus 909, or installed from the storage apparatus 908 or from the ROM 902. When executed by the processing apparatus 901, the computer program performs the aforementioned functions defined in the method of some embodiments of the present disclosure. Some embodiments of the present disclosure further include a computer program that, when running on an electronic device, performs the aforementioned functions defined in the method of some embodiments of the present disclosure.

It should be noted that the computer readable medium described in some embodiments of the present disclosure may be a computer readable signal medium or a computer readable storage medium or any combination thereof. The computer readable storage medium may be, for example, but not limited to, an electrical, magnetic, optical, electromagnetic, infrared, or semiconductor system, apparatus or equipment, or any combination thereof. More specific examples of the computer readable storage medium may include, but are not limited to, an electrical connection with one or more wires, a portable computer disk, a hard disk, a random-access memory (RAM), a read-only memory (ROM), an erasable programmable read-only memory (EPROM) or a flash memory, an optical fiber, a portable compact disk read-only memory (CD-ROM), an optical storage equipment, a magnetic storage equipment, or any suitable combination thereof. In some embodiments of the present disclosure, the computer readable storage medium may be any tangible medium that contains or stores a program, and the program may be used by or in combination with an instruction executing system, apparatus or equipment. In some embodiments of the present disclosure, the computer readable signal medium may include a data signal propagated in baseband or as a part of a carrier wave, in which computer readable program code is carried. This kind of propagated data signal may be in a plurality of forms, including but not limited to an electromagnetic signal, an optical signal or any suitable combination thereof. The computer readable signal medium may also be any computer readable medium other than the computer readable storage medium, and the computer readable signal medium may send, propagate or transmit a program which is used by or in combination with an instruction executing system, apparatus or equipment. Program code contained in the computer readable medium may be transmitted by any suitable medium, including but not limited to: an electric wire, an optical cable, RF (radio frequency), etc., or any suitable combination thereof.

In some embodiments, a client and a server may communicate using any currently known or future developed network protocol, such as HTTP (Hyper Text Transfer Protocol), and may be interconnected with any form or medium of digital data communication (e.g., a communication network). Examples of the communication network include a local area network ("LAN"), a wide area network ("WAN"), an Internet work (e.g., the Internet) and an end-to-end network (e.g., an ad hoc end-to-end network), as well as any currently known or future developed networks.

The computer readable medium may be included in the aforementioned electronic device, or may exist alone without being assembled into the electronic device. The computer readable medium carries one or more programs, and when executed by the electronic device, the one or more programs cause the electronic device to: display a video playing page, where the video playing page includes video information and a user interaction control; in response to detecting a first user operation of a user on the video playing page, hide the video information, adjust opacity of the user interaction control from initial opacity to target opacity, and adjust a display position of the user interaction control from an initial position to a target position, where obstructed area of a video displayed on the video playing page when the user interaction control is at the target position is smaller than obstructed area of the video displayed on the video playing page when the user interaction control is at the initial position.

Computer program code for performing operations of some embodiments in the present disclosure may be written in one or more programming languages or a combination thereof, and the programming languages includes but are not limited to object-oriented programming languages such as Java, Smalltalk and C++, as well as conventional procedural programming languages such as "C" language or similar programming languages. The program code may be completely executed on a user's computer, partially executed on a user's computer, executed as an independent software package, partially executed on a user's computer and partially executed on a remote computer, or completely executed on a remote computer or a server. In a condition of involving the remote computer, the remote computer may be connected to the user's computer through any kind of networks, including a local area network (LAN) or a wide area network (WAN), or may be connected to an external computer (for example, being connected through the Internet with Internet service providers).

Flowcharts and block diagrams in the drawings illustrate architectures, functions and operations of possible implementations of systems, methods and computer program products according to various embodiments of the present disclosure. In this regard, each block in the flowcharts or block diagrams may represent a module, a program segment, or a part of code, and the module, the program segment or the part of code contains one or more executable instructions for implementing specified logical functions. It should also be noted that in some alternative implementations, the functions labeled in the blocks may also occur in a different order than those labeled in the drawings. For example, two blocks shown in succession may actually be executed substantially in parallel, and sometimes they may be executed in a reverse order, which depends on functions involved. It should also be noted that each block in the block diagrams and/or flowcharts, and combinations of blocks in the block diagrams and/or flowcharts, may be implemented by a dedicated hardware-based system which performs specified functions or operations, or may be implemented by a combination of dedicated hardware and computer instructions.

Units described in some embodiments of the present disclosure may be implemented by software or hardware.

The described units may also be provided in a processor, for example, it may be described as: a processor includes a displaying unit and an adjusting unit. In some cases, names of these units do not constitute a limitation on the units per se, for example, a displaying module may also be described as "a unit displaying a video playing page".

The functions described above herein may be at least partially executed by one or more hardware logic components. For example, without limitation, an exemplary type of hardware logic component that may be used includes: a field programmable gate array (FPGA), an application specific integrated circuit (ASIC), application specific standard parts (ASSP), a system on chip (SOC), a complex programmable logic apparatus (CPLD), etc.

According to one or more embodiments of the present disclosure, a video playing method is provided, including: displaying a video playing page, where the video playing page includes video information and a user interaction control; in response to detecting a first user operation of a user on the video playing page, hiding the video information, adjusting opacity of the user interaction control from initial opacity to target opacity, and adjusting a display position of the user interaction control from an initial position to a target position, where obstructed area of a video displayed on the video playing page when the user interaction control is at the target position is smaller than obstructed area of the video displayed on the video playing page when the user interaction control is at the initial position.

According to one or more embodiments of the present disclosure, the method further includes: in response to detecting a first user operation of a user on the video playing page, displaying at least one of the following: a video progress adjustment control, a video playing control, or a video rotation control.

According to one or more embodiments of the present disclosure, the video playing page further includes pushed information related to the video being played currently; and the method further includes: in response to detecting the first user operation of the user on the video playing page, hiding the pushed information.

According to one or more embodiments of the present disclosure, the video playing page further includes a first control, where the first control is used to trigger a page jump; and the method further includes: in response to detecting a second user operation of the user on the first control, displaying a jump page corresponding to the video being played currently.

According to one or more embodiments of the present disclosure, the method further includes: in response to the video displayed on the video playing page being a landscape video, displaying a landscape entry control on the video playing page, where the landscape entry control is used to trigger entry into a landscape page; and in response to detecting a third user operation on the landscape entry control, displaying the video displayed on the video playing page in a landscape mode.

According to one or more embodiments of the present disclosure, the method further includes: in response to detecting a fourth user operation of the user on the video playing page in a condition that the video information is hidden and the display position and the opacity of the user interaction control are changed, redisplaying the video information, restoring the opacity of the user interaction control to the initial opacity, and restoring the display position of user interaction control to the initial position.

According to one or more embodiments of the present disclosure, a video playing apparatus is provided, including: a displaying unit, configured to display a video playing page, where the video playing page includes video information and a user interaction control; an adjusting unit, configured to, in response to detecting a first user operation of a user on the video playing page, hide the video information, adjust opacity of the user interaction control from initial opacity to target opacity, and adjust a display position of the user interaction control from an initial position to a target position, where obstructed area of a video displayed on the video playing page when the user interaction control is at the target position is smaller than obstructed area of the video displayed on the video playing page when the user interaction control is at the initial position.

According to one or more embodiments of the present disclosure, the adjusting unit may further be configured to, in response to detecting a first user operation of a user on the video playing page, display at least one of the following: a video progress adjustment control, a video playing control, or a video rotation control.

According to one or more embodiments of the present disclosure, the video playing page further includes pushed information related to the video being played currently; and the apparatus may further include a hiding unit, where the hiding unit is configured to, in response to detecting the first user operation of the user on the video playing page, hide the pushed information.

According to one or more embodiments of the present disclosure, the video playing page further includes a first control, where the first control is used to trigger a page jump; and the apparatus may further include a displaying unit, where the displaying unit is configured to, in response to detecting a second user operation of the user on the first control, displaying a jump page corresponding to the video being played currently.

According to one or more embodiments of the present disclosure, the displaying unit is further configured to: in response to the video displayed on the video playing page being a landscape video, display a landscape entry control on the video playing page, where the landscape entry control is used to trigger entry into a landscape page; and in response to detecting a third user operation on the landscape entry control, display the video displayed on the video playing page in a landscape mode.

According to one or more embodiments of the present disclosure, the adjusting unit may also be further configured to: in response to detecting a fourth user operation of the user on the video playing page in a condition that the video information is hidden and the display position and the opacity of the user interaction control are changed, redisplay the video information, restore the opacity of the user interaction control to the initial opacity, and restore the display position of user interaction control to the initial position.

According to one or more embodiments of the present disclosure, the displaying unit is further configured to: in response to detecting a video switching operation of the user on the video playing page in the condition that the video information is hidden and the display position and the opacity of the user interaction control are changed, display a video after switching and video information of the video after switching, and display the user interaction control at the initial position with the initial opacity.

According to one or more embodiments of the present disclosure, an electronic device is provided, including: one or more processors; a storage apparatus on which one or more programs are stored, where when the one or more programs are executed by the one or more processors, the one or more processors are caused to implement any one of the methods described above.

According to one or more embodiments of the present disclosure, a computer readable medium is provided, and a computer program is stored on the computer readable medium, where any one of the methods described above is implemented when the program is executed by a processor.

The above description is only preferred embodiments of the present disclosure and an explanation of applied technical principles. Persons skilled in the art should understand that the scope of disclosure involved in the embodiments of the present disclosure is not limited to technical solutions formed by specific combinations of the above technical features, but also covers other technical solutions formed by any combination of the above technical features or their equivalent features without departing from the above inventive concept. For example, a technical solution formed by mutually replacing the aforementioned features with technical features with similar functions disclosed in the embodiments of the present disclosure (but not limited to).

What is claimed is:

1. A video playing method, the method comprising:
    displaying a video playing page, wherein the video playing page comprises video information and at least two user interaction controls; and
    in response to detecting a first user operation of a user on the video playing page, hiding the video information; adjusting opacity of the at least two user interaction controls from initial opacity to target opacity; adjusting display positions of the at least two user interaction controls from initial positions to target positions, wherein obstructed area of a video displayed on the video playing page when the at least two user interaction controls are at the target positions is smaller than obstructed area of the video displayed on the video playing page when the at least two user interaction controls are at the initial positions; and displaying at least one of the following: a video progress adjustment control, a video playing control, or a video rotation control,
    wherein the adjusting the display positions of the at least two user interaction controls from the initial positions to the target positions comprises:
    moving the display positions of the at least two user interaction controls to shorten a distance between the at least two user interaction controls.

2. The method according to claim 1, wherein the video playing page further comprises pushed information related to a video being played currently, and
    the method further comprises:
    in response to detecting the first user operation of the user on the video playing page, hiding the pushed information.

3. The method according to claim 1, wherein the video playing page further comprises a first control, and the first control is used to trigger a page jump; and
    the method further comprises:
    in response to detecting a second user operation of the user on the first control, displaying a jump page corresponding to the video being played currently.

4. The method according to claim 1, the method further comprising:
    in response to the video displayed on the video playing page being a landscape video, displaying a landscape entry control on the video playing page, wherein the landscape entry control is used to trigger entry into a landscape page; and
    in response to detecting a third user operation on the landscape entry control, displaying the video displayed on the video playing page in a landscape mode.

5. The method according to claim 1, the method further comprising:
    in response to detecting a fourth user operation of the user on the video playing page in a condition that the video information is hidden and the display positions and the opacity of the at least two user interaction controls are changed, redisplaying the video information, restoring the opacity of the at least two user interaction controls to the initial opacity, and restoring the display positions of the at least two user interaction controls to the initial positions.

6. The method according to claim 1, the method further comprising:
    in response to detecting a video switching operation of the user on the video playing page in a condition that the video information is hidden and the display positions and the opacity of the at least two user interaction controls are changed, displaying a video after switching and video information of the video after switching, and displaying the at least two user interaction controls at the initial positions with the initial opacity.

7. A video playing apparatus, the apparatus comprising:
    one or more processors;
    a storage apparatus on which one or more programs are stored,
    wherein when the one or more programs are executed by the one or more processors, the one or more processors are caused to:
    display a video playing page, wherein the video playing page comprises video information and at least two user interaction controls; and
    in response to detecting a first user operation of a user on the video playing page, hide the video information; adjust opacity of the at least two user interaction controls from initial opacity to target opacity; adjust display positions of the at least two user interaction controls from initial positions to target positions, wherein obstructed area of a video displayed on the video playing page when the at least two user interaction controls are at the target positions is smaller than obstructed area of the video displayed on the video playing page when the at least two user interaction controls are at the initial positions; and display at least one of the following: a video progress adjustment control, a video playing control, or a video rotation control,
    wherein the one or more processors are further caused to:
    move the display positions of the at least two user interaction controls to shorten a distance between the at least two user interaction controls.

8. The apparatus according to claim 7, wherein the video playing page further comprises pushed information related to a video being played currently, and the one or more processors are further caused to:
    in response to detecting the first user operation of the user on the video playing page, hide the pushed information.

9. The apparatus according to claim 7, wherein the video playing page further comprises a first control, and the first control is used to trigger a page jump, and the one or more processors are further caused to:
    in response to detecting a second user operation of the user on the first control, display a jump page corresponding to the video being played currently.

10. The apparatus according to claim 7, wherein the one or more processors are further caused to:
in response to the video displayed on the video playing page being a landscape video, display a landscape entry control on the video playing page, wherein the landscape entry control is used to trigger entry into a landscape page; and
in response to detecting a third user operation on the landscape entry control, display the video displayed on the video playing page in a landscape mode.

11. The apparatus according to claim 7, wherein the one or more processors are further caused to:
in response to detecting a fourth user operation of the user on the video playing page in a condition that the video information is hidden and the display positions and the opacity of the at least two user interaction controls are changed, redisplay the video information, restore the opacity of the at least two user interaction controls to the initial opacity, and restore the display positions of the at least two user interaction controls to the initial positions.

12. The apparatus according to claim 7, wherein the one or more processors are further caused to:
in response to detecting a video switching operation of the user on the video playing page in a condition that the video information is hidden and the display positions and the opacity of the at least two user interaction controls are changed, display a video after switching and video information of the video after switching, and display the at least two user interaction controls at the initial positions with the initial opacity.

13. A non-transitory computer readable storage medium on which a computer program is stored, wherein when the computer program is executed by a processor, the processor is caused to:
display a video playing page, wherein the video playing page comprises video information and at least two user interaction controls; and
in response to detecting a first user operation of a user on the video playing page, hide the video information; adjust opacity of the at least two user interaction controls from initial opacity to target opacity; adjust display positions of the at least two user interaction controls from initial positions to target positions, wherein obstructed area of a video displayed on the video playing page when the at least two user interaction controls are at the target positions is smaller than obstructed area of the video displayed on the video playing page when the at least two user interaction controls are at the initial positions; and display at least one of the following: a video progress adjustment control, a video playing control, or a video rotation control,
wherein the processor is further caused to:
move the display positions of the at least two user interaction controls to shorten a distance between the at least two user interaction controls.

14. The non-transitory computer readable storage medium according to claim 13, wherein the video playing page further comprises pushed information related to a video being played currently, and the processor is further caused to:
in response to detecting the first user operation of the user on the video playing page, hide the pushed information.

15. The non-transitory computer readable storage medium according to claim 13, wherein the video playing page further comprises a first control, and the first control is used to trigger a page jump, and the processor is further caused to:
in response to detecting a second user operation of the user on the first control, display a jump page corresponding to the video being played currently.

16. The non-transitory computer readable storage medium according to claim 13, wherein the processor is further caused to:
in response to the video displayed on the video playing page being a landscape video, display a landscape entry control on the video playing page, wherein the landscape entry control is used to trigger entry into a landscape page; and
in response to detecting a third user operation on the landscape entry control, display the video displayed on the video playing page in a landscape mode.

17. The non-transitory computer readable storage medium according to claim 13, wherein the processor is further caused to:
in response to detecting a fourth user operation of the user on the video playing page in a condition that the video information is hidden and the display position and the opacity of the user interaction control are changed, redisplay the video information, restore the opacity of the user interaction control to the initial opacity, and restore the display position of user interaction control to the initial position.

18. The method according to claim 1, wherein a function of pausing the video in response to detecting the first user operation of the user on the video playing page is removed.

19. The apparatus according to claim 7, wherein a function of pausing the video in response to detecting the first user operation of the user on the video playing page is removed.

20. The non-transitory computer readable storage medium according to claim 13, wherein a function of pausing the video in response to detecting the first user operation of the user on the video playing page is removed.

* * * * *